United States Patent
Smith-Berry et al.

[11] Patent Number: 5,890,421
[45] Date of Patent: Apr. 6, 1999

[54] BREAD STICK RACK FOR PORTABLE BREAD OVENS

[75] Inventors: Holly Smith-Berry, Fulton, Mo.; Michael Sit, Kowloon, Hong Kong

[73] Assignee: Toastmaster Inc., Columbia, Mo.

[21] Appl. No.: 781,902

[22] Filed: Dec. 30, 1996

[51] Int. Cl.$^6$ .................................................. A47J 37/00
[52] U.S. Cl. ................................ 99/441; 99/448; 126/281
[58] Field of Search ........................... 99/413, 416, 426, 99/431, 441, 448, 353, 399; 249/119, 120; 126/284, 281

[56] References Cited

U.S. PATENT DOCUMENTS

| | | | |
|---|---|---|---|
| 2,329,937 | 9/1943 | Orkfritz | 99/441 X |
| 4,014,451 | 3/1977 | Cannon et al. | 220/20.5 |
| 4,285,979 | 8/1981 | Izzi | 426/94 |
| 4,646,628 | 3/1987 | Lederman | 99/413 |
| 4,970,949 | 11/1990 | Ferrara, Jr. et al. | 99/374 |
| 5,000,084 | 3/1991 | Walliker | 99/354 |
| 5,191,830 | 3/1993 | Jacobson | 99/439 |
| 5,359,924 | 11/1994 | Roberts et al. | 99/441 X |

FOREIGN PATENT DOCUMENTS

| | | | |
|---|---|---|---|
| 70350 | 4/1946 | Denmark | 99/416 |

*Primary Examiner*—Reginald L. Alexander
*Attorney, Agent, or Firm*—Stinson, Mag & Fizzell, P.C.

[57] ABSTRACT

A bread stick rack for portable bread ovens fits within the baking well of a home kitchen appliance type portable bread oven. The rack is readily insertable and removable from the bread oven and has a plurality of individual bread stick molds. In use, rolled strips of dough are placed in each of the stick molds and then oven heated through its bake cycle so as to bake the sticks within the mold and conform them to the mold configuration. After baking, the rack is removable from the oven and the individual bread stick molds removable from the rack so as to shake or knock out the bread sticks from their individual molds.

4 Claims, 2 Drawing Sheets

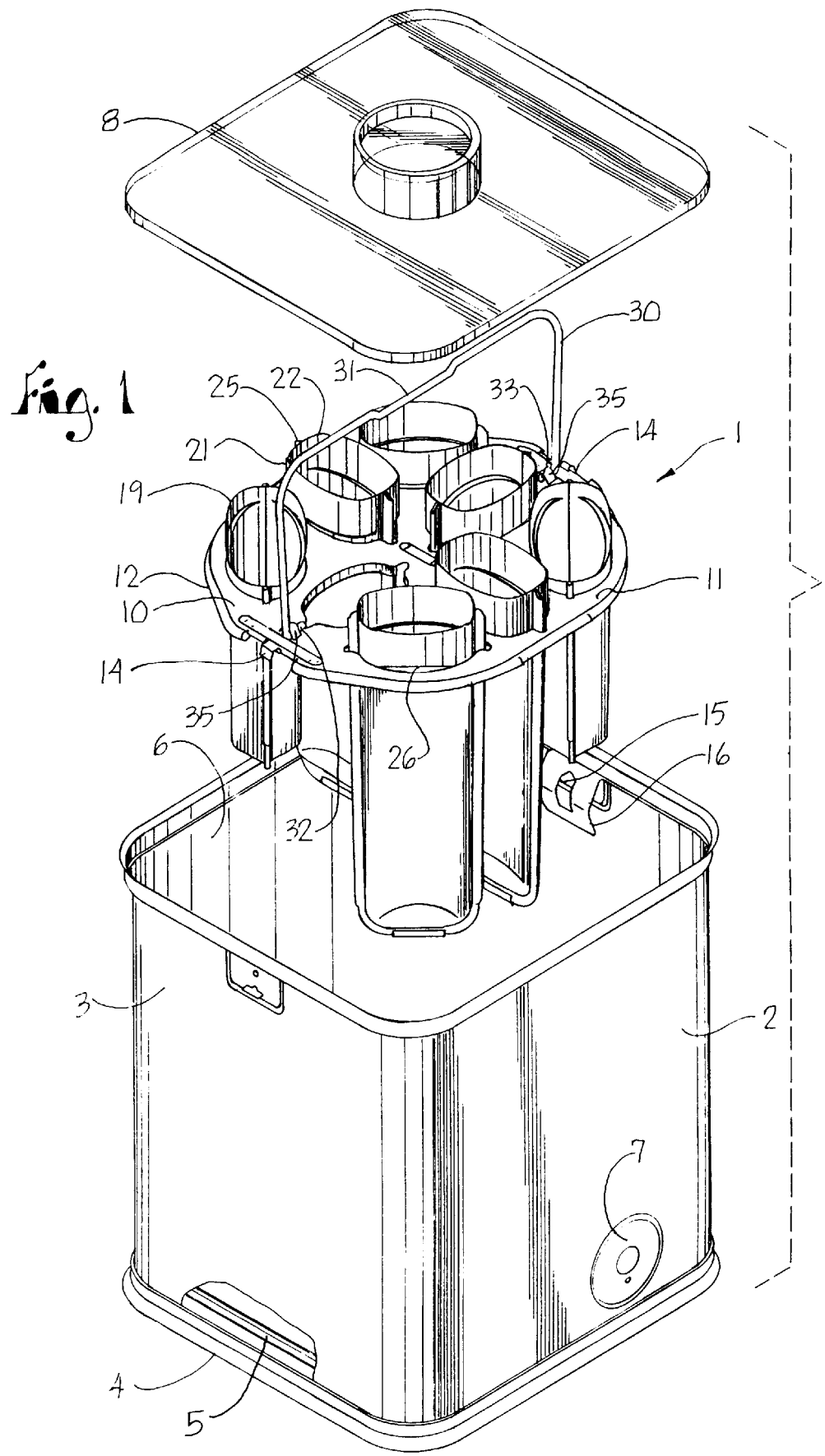

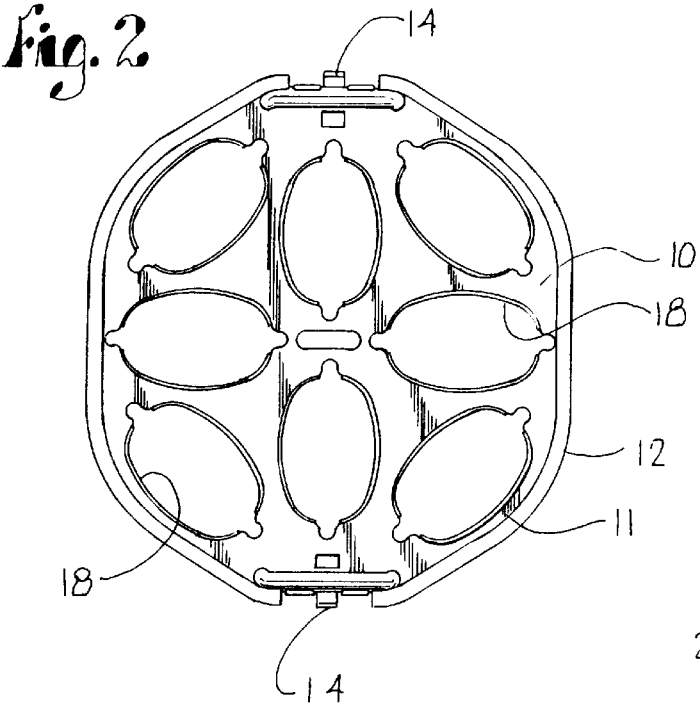
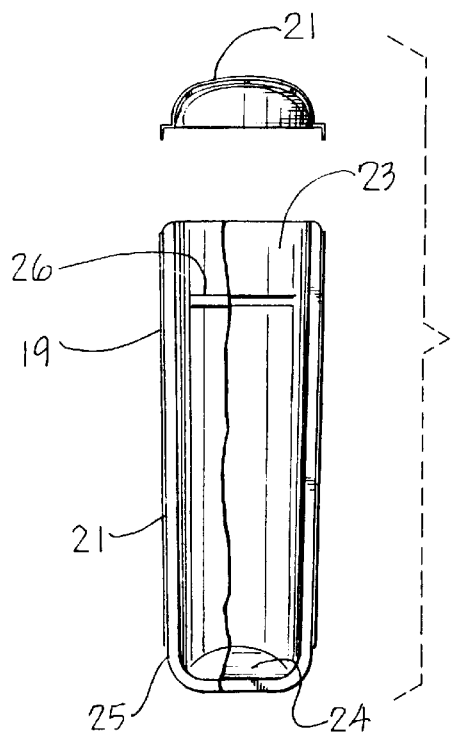
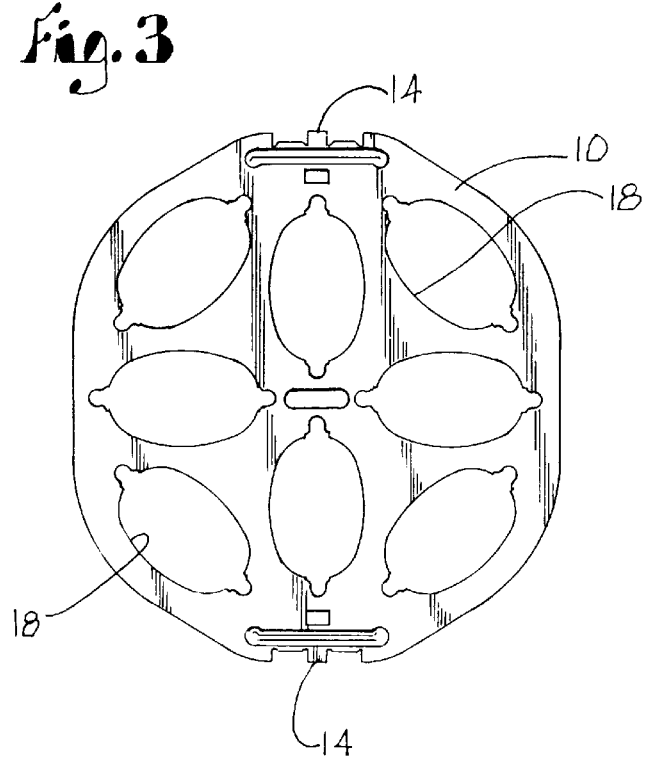

BREAD STICK RACK FOR PORTABLE BREAD OVENS

FIELD OF THE INVENTION

This invention relates to home baking appliances and in particular to portable bread ovens.

BACKGROUND OF THE INVENTION

Bread sticks are popular bakery items which have been difficult to bake at home with consistency of shape and ease of baking. Home bread maker devices have become increasingly popular in recent years. These usually consist of a portable oven with an open top and removable glass cover. These ovens are electrically heated and include timer and temperature controls so that the home bread maker may place a body of uncooked dough within the oven, set the timer and the bread maker will turn on automatically and bake the bread on a desired schedule. In this manner, the person can awake or come home to the odor of fresh bread much as he/she awakes to the smell of fresh coffee through timer coffee pots.

SUMMARY OF THE INVENTION

A removable and replaceable rack for producing bread sticks fits in a home portable bread oven. The rack has a plurality of separately removable bread stick molds therein, each conforming to the desired shape of a bread stick. In use, the baker places an appropriate long thin stick of dough within the mold, places the molds within the rack and then places the rack within the oven by connectors extending between the rack and the oven. The oven is run through its heating cycle, the bread sticks are baked and upon conclusion of the baking cycle, the entire rack is easily lifted out and removed from the oven. The individual bread stick molds are removed from the rack and the baked bread sticks are knocked out of the molds or easily lifted out with the aid of a dull kitchen knife.

The objects of the present invention are to produce a rack device which is useful for making bread sticks within a conventional home bread oven. A further object of the present invention is to produce a bread rack which has removable bread stick molds so that each mold can be taken out and the baked bread stick removed easily from the mold. Still a further object is to provide a removable rack which does not degrade the utility of the portable bread oven but expands its utility and is simple and efficient to use and not costly for the home user. Other objects and advantages of the invention will become apparent from the following description taken in connection with the drawings.

DESCRIPTION OF THE DRAWINGS

FIG. 1 is a partially disassembled, perspective view of a portable bread oven and a removable bread stick rack embodying the present invention.

FIG. 2 is a top plan view of the bread stick rack.

FIG. 3 is a bottom view of the bread stick rack.

FIG. 4 is an elevational, longitudinally sectional view of a bread stick mold.

DESCRIPTION OF THE PREFERRED EMBODIMENT

Referring to FIG. 1, a bread stick making rack 1 is positionable within a home or portable type bread oven 2. In the illustrated example, the bread oven 2 has a surrounding wall, for example, four walls 3 which rest upon a base 4. A heating element 5 within the walls 3 defines a baking well 6 for baking dough placed within the oven 2. An adjustment knob and timing mechanism 7 controls the heating element 5 and provides temperature adjustment. Typically, such an adjustment knob and timing mechanism 7 also includes a time setting mechanism so that the baker may select appropriate on and off program times. Finally, a removable cover 8 provides a closure means for the oven 2. In the illustrated example, the removable cover 8 is of a temperature resistant glass so that the baking product may be viewed while baking.

The rack 1 consists of a plate or planar member 10 generally conforming to the cross sectional shape of the baking well 6. The planar member 10 has an outer portion 11 with a rolled edge 12 which generally conforms to the sidewalls of the baking well 6. Connectors extend between the planar member 10 and the bread oven 2. In the illustrated example, the connectors include a downwardly bent tab 14 which is received in an aperture 15 and a spring clip 16 extending inwardly from the walls 3 and into the baking well 6. Two such tab 14, aperture 15 and clip 16 arrangements are disclosed in connection with the preferred embodiment, the connectors being diametrically opposed to suspend the rack 1 within the bread oven 2. Other types of connecting means may be used as appropriate.

The planar member 10 includes a plurality of mold receptacles 18, each conforming to the exterior dimensions of a mold 19 to be placed therein. In the illustrated example, each mold 19 is of an elongate shape, oval in cross-section, and is formed of two longitudinal halves 21 and 22 and with an open top 23 and a closed bottom 24. Diametrically opposed sidewall flanges 25 connect the two halves 21 and 22. A raised rib 26 adjacent the open top 23 provides a stop or abutment for limiting movement of the mold 19 into the mold receptacle 18. This leaves a small portion of the mold 19 at its open top 23 projecting above the planar member 10, approximately one inch in height for a mold 19 of normal dimension. Various sizes and shapes of bread stick molds may be used as desired, not necessarily of an oval or cylindrical shape.

In the illustrated example, FIG. 1, there are eight molds 19 arranged in the planar member 10, with the molds 19 arranged so as to make most efficient use of the space provided.

To facilitate placement of the rack 1 within the bread oven 2, the planar member 10 includes a handle or bail 30 such as in the form of a wire handle bent into an elongated, inverted U shape having a top gripping portion 31 and bent ends 32 and 33 trapped beneath struck retainers 35 in the planar member 10. The bail 30 usually swings from side to side and to a vertical position for lifting.

With respect to materials of construction, the planar member 10 is preferably of cool rolled steel and the bread stick molds 19 are of a non-stick coated aluminum. Various non-stick substances are well known in the art and may be employed as desired.

Operation of the bread stick rack 1 is quick and easy and includes placing the molds 19 within the rack 1 of planar member 10, rolling a stick of desired thickness and length and placing such sticks of dough within each of the molds 19. The adjustment knob and timing mechanism 7 of the bread oven 2 is set as desired for proper baking, the cover 8 is placed on the oven 2 and baking commences. After the baking side of the cycle is completed, the cover 8 is removed, and the bail 30 grasped to lift the planar member 10 and molds 19 from oven 2. The individual molds 19 are removed the planar member 10, inverted to knock out the baked bread stick or in some cases, the bread stick may need to be slid loose from the mold 19 through the use of a dull knife.

Although the above invention has been described with reference to the drawings and specification, it is not to be so limited except as set forth in the following claims.

What is desired to be claimed and secured as Letters Patent is as follows:

1. A device for baking bread sticks, comprising:
   (a) an open-topped breadbaking oven comprising a surrounding wall, a baking well, a heating element, and a removable cover;
   (b) a rack removably mounted in said baking well, said rack comprising:
      (i) a plate having a plurality of oval openings formed therein wherein the periphery of said plate generally conforms to the sidewalls of said baking well;
      (ii) a handle extending from said plate for lowering said rack into said baking well and lifting said rack out of said baking well; and
   (c) a plurality of bread stick molds removably mounted in said rack by inserting each said mold into one of said oval openings in said plate, each said mold comprising an elongate hollow body being oval in cross-section and having an open end for receipt of bread dough and a closed end for insertion into one of said mold receptacles.

2. A device for baking bread sticks, comprising:
   (a) an open-topped breadbaking oven comprising a surrounding wall, a baking well, a heating element, and a removable cover;
   (b) a rack removably mounted in said baking well, said rack comprising a plate having a plurality of mold receptacles formed therein; and
   (c) a plurality of bread stick molds removably mounted in said rack by inserting each said mold into one of said mold receptacles, each said mold shaped to form a cylindrical bread stick;
   (d) wherein each said breadstick mold comprises an elongate hollow body having an open end for receipt of bread dough and a closed end for insertion into one of said mold receptacles;
   (e) wherein each said breadstick mold has at least one flange extending longitudinally along its length, and wherein each said mold receptacle has at least one notch formed therein such that said flange slidingly mates with said notch when said breadstick mold is inserted into said mold receptacle.

3. A device for baking bread sticks, comprising:
   (a) an open-topped breadbaking oven comprising a surrounding wall, a baking well, a heating element, and a removable cover;
   (b) a rack removably mounted in said baking well, said rack comprising a plate having a plurality of mold receptacles formed therein; and
   (c) a plurality of bread stick molds removably mounted in said rack by inserting each said mold into one of said mold receptacles, each said mold shaped to form a cylindrical bread stick;
   (d) wherein said rack has at least one tab connector and said breadbaking oven has at least one spring clip connector mateable with said tab connector for mounting said rack in said baking well, said spring clip connector having an aperture for receiving said tab connector.

4. A device for insertion into a breadmaker, comprising:
   (a) a rack comprising a plate having a plurality of mold receptacles formed therein; and
   (b) a plurality of bread stick molds removably mounted in said rack by inserting each said mold into one of said mold receptacles, each said mold shaped to form a cylindrical bread stick;
   (c) wherein each said breadstick mold comprises an elongate hollow body having an open end for receipt of bread dough and a closed end for insertion into one of said mold receptacles;
   (d) wherein said body of each said breadstick mold has at least one flange extending longitudinally along its length, and wherein each said mold receptacle has at least one notch formed therein such that said flange slidingly mates with said notch when said breadstick mold is inserted into said mold receptacle.

* * * * *